United States Patent
Mitchell et al.

(10) Patent No.: US 10,452,466 B1
(45) Date of Patent: Oct. 22, 2019

(54) AUTOMATED SYSTEM MAINTENANCE CAPABILITIES FOR A COMPUTING SYSTEM

(71) Applicant: Architecture Technology Corporation, Minneapolis, MN (US)

(72) Inventors: Tyler J. Mitchell, Ithaca, NY (US); Kenneth McVearry, Dewitt, NY (US)

(73) Assignee: ARCHITECTURE TECHNOLOGY CORPORATION, Minneapolis, MN (US)

(*) Notice: Subject to any disclaimer, the term of this patent is extended or adjusted under 35 U.S.C. 154(b) by 142 days.

(21) Appl. No.: 15/826,527

(22) Filed: Nov. 29, 2017

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0712* (2013.01); *G06F 11/0751* (2013.01); *G06F 11/0769* (2013.01); *G06F 11/0793* (2013.01); *G06F 11/301* (2013.01); *G06F 11/302* (2013.01); *G06F 11/3006* (2013.01); *G06F 11/3495* (2013.01)

(58) Field of Classification Search
CPC ............. G06F 11/0709; G06F 11/0712; G06F 11/0751; G06F 11/0769; G06F 11/079; G06F 11/0793; G06F 11/3006; G06F 11/301; G06F 11/302; G06F 11/3495
See application file for complete search history.

(56) References Cited

U.S. PATENT DOCUMENTS

| | | | | |
|---|---|---|---|---|
| 2005/0033625 | A1* | 2/2005 | Kline | G06Q 10/06 705/7.24 |
| 2006/0047481 | A1* | 3/2006 | Kanai | G06F 11/0709 702/184 |

(Continued)

OTHER PUBLICATIONS

Sjoberg, "Managing Change in Information Systems: Technological Challenges," Department of Informatics, University of Oslo, n.d. Web, Mar. 1995, 13 pp.

(Continued)

*Primary Examiner* — Joshua P Lottich
(74) *Attorney, Agent, or Firm* — Shumaker & Sieffert, P.A.

(57) ABSTRACT

An example method includes receiving one or more cross-platform system maintenance rules that are generated by and sent from a central server computing system, determining a type of software operating system currently being executed by a client computing system, determining, based on the one or more cross-platform system maintenance rules and further based on the type of software operating system, one or more platform-specific system maintenance rules that specify one or more platform-specific system maintenance operations and scheduling information, and determining, based on scheduling information identified by the one or more platform-specific system maintenance rules, a schedule indicating when to perform the one or more platform-specific system maintenance operations. The example method includes initiating performance of the one or more platform-specific system maintenance operations in accordance with the schedule, collecting one or more results, and generating and sending at least one summary report.

30 Claims, 5 Drawing Sheets

(51) Int. Cl.
*G06F 11/30* (2006.01)
*G06F 11/34* (2006.01)

(56) References Cited

U.S. PATENT DOCUMENTS

| | | | | |
|---|---|---|---|---|
| 2013/0124713 | A1* | 5/2013 | Feinberg | G06F 11/0769 709/224 |
| 2014/0278340 | A1* | 9/2014 | Berkowitz | G06F 9/3004 703/23 |
| 2015/0293800 | A1* | 10/2015 | Shivanna | G06F 11/0748 714/37 |
| 2016/0092811 | A1* | 3/2016 | Iyer | G06Q 10/0637 705/7.36 |
| 2018/0285840 | A1* | 10/2018 | Hasan | G06Q 20/0655 |

OTHER PUBLICATIONS

"Automatic Maintenance," Microsoft Developer Resources, retrieved from https://msdn.microsoft.com/en-us/library/windows/desktop/hh848037(v=vs.85).aspx, Nov. 29, 2017, 10 pp.

Warren, "Automatic Database Upkeep with the SQL Server Maintenance Plan Wizard," TechRepublic, Jan. 28, 2002, 15 pp.

"Continuous Automation for the Continuous Enterprise," Chef.io, retrieved from https://www.chef.io/, Sep. 26, 2017, 15 pp.

"How Ansible Works," Ansible.com, retrieved from https://www.ansible.com/how-ansible-works, Sep. 26, 2017, 7 pp.

"Red Hat Ansible Automation," redhat.com, retrieved from https://www.redhat.com/en/technologies/management/ansible, on Sep. 26, 2017, 7 pp.

"Saltstack Enterprise," saltstack.com, retrieved from https://saltstack.com/saltstack-enterprise, Sep. 26, 2017, 5 pp.

"Continuous Integration and Delivery with Ansible," Ansible, White Paper, retrieved from https://www.redhat.com/cms/managed-files/ContinuousDelivery-WhitePaper.pdf, Sep. 26, 2017, 7 pp.

Shaw, "Ansible v.s. Salt (SaltStack) v.s. StackStorm," ,medium.com, retrieved from https://medium.com/@anthonypjshaw/ansible-v-s-salt-saltstack-v-s-stackstorm-3d8f57149368, Sep. 26, 2017, 22 pp.

"Salt Open Source," saltstack.com, retrieved from https://saltstack.com/salt-open-source/, Sep. 26, 2017, 4 pp.

"Salt in 10 Minutes," saltstack.com, retrieved from https://docs.saltstack.com/en/latest/topics/tutorials/walkthrough.html, Sep. 26, 2017, 10 pp.

"Achieve Speed, Scale, and Consistency by Automating Your Infrastructure with Chef," Chef.io, retrieved from https://www.chef.io/, Sep. 26, 2017, 9 pp.

* cited by examiner

US 10,452,466 B1

AUTOMATED SYSTEM MAINTENANCE CAPABILITIES FOR A COMPUTING SYSTEM

STATEMENT REGARDING FEDERALLY SPONSORED RESEARCH OR DEVELOPMENT

This invention was made with Government support under contract number W81XWH-18-C-0037 with the United States Army. The Government has certain rights in this invention.

TECHNICAL FIELD

The present disclosure relates to computing systems and, more particularly, to computing systems that implement system maintenance functionality.

BACKGROUND

The process of monitoring, evaluating, and/or modifying existing computing systems to make required or desirable improvements is often referred to as system maintenance. System maintenance is typically an ongoing activity that covers a wide variety of activities, including the removal of program or design errors and updating documentation or test data. System maintenance may include both corrective and preventive tasks that are performed on one or more computing systems.

In general, system maintenance is time consuming and expensive. It can also, in many cases, cause extensive downtime if done improperly. To avoid improper system maintenance, extensive training is often required for existing systems, with additional training required for new capabilities before they can be implemented. This training often slows the deployment of new capabilities.

SUMMARY

As outlined above, system maintenance may often be time consuming and expensive, and it can also, in some cases, cause extensive downtime if done improperly. To address these and other issues associated with existing system maintenance efforts, various techniques of the present disclosure are directed to maintenance software applications that may be executed by remote client computing systems and that may be triggered by events or rules that are provided by a central server computing system. The techniques described herein may leverage features that are built into one or more operating systems that are executed by the client computing systems in order to manage various maintenance activities such as backups, updates, patches, restorations, monitoring, and other system maintenance tasks. The described examples may provide certain technical advantages, such as, for example, leveraging various operating system components (e.g., task scheduling or group policies for Windows, crontab for Linux, application deployment system for Android) to assist in the overall maintenance process to perform system maintenance tasks. The techniques described may also provide, e.g., the technical benefit of performing automated maintenance on remote client systems through the use of deployed system maintenance rules (e.g., cross-platform rules) that are provided by a centralized server to client systems, where the client systems may then generate platform-specific rules and perform platform-specific system maintenance operations based on the types of operating systems used by such client systems.

In one example, a method includes receiving, by at least one software application executing on a client computing system, one or more cross-platform system maintenance rules that are generated by and sent from a central server computing system, wherein the one or more cross-platform system maintenance rules specify one or more cross-platform system maintenance operations to be performed on the client computing system and further specify scheduling information for performance of the one or more cross-platform system maintenance operations, and wherein the one or more cross-platform system maintenance rules are not specific to any particular type of software operating system, and determining, by the at least one software application executing on the client computing system, a type of software operating system currently being executed by the client computing system. The example method further includes determining, by the at least one software application executing on the client computing system, based on the one or more cross-platform system maintenance rules and further based on the type of software operating system currently being executed by the client computing system, one or more platform-specific rules that specify one or more platform-specific system maintenance operations to be performed on the client computing system and further specify scheduling information for performance of the one or more platform-specific system maintenance operations, wherein the one or more platform-specific system maintenance rules are specific to the type of software operating system currently being executed by the client computing system, and determining, by the at least one software application executing on the client computing system, and based on the scheduling information identified by the one or more platform-specific system maintenance rules, a schedule indicating when to perform the one or more platform-specific system maintenance operations. The example method further includes initiating, by the at least one software application executing on the client computing system, performance of the one or more platform-specific system maintenance operations in accordance with the schedule, and collecting, by the at least one software application executing on the client computing system, one or more results associated with the performance of the one or more platform-specific system maintenance operations. The example method further includes generating, by at least one software application executing on the client computing system, at least one summary report that includes the one or more results, and sending, by at least one software application executing on the client computing system, and to the central server computing system, the at least one summary report.

In one example, a computing system includes one or more processors and a non-transitory computer-readable storage medium. The non-transitory computer-readable storage medium stores instructions that, when executed, cause the one or more processors of a client computing system to receive, by at least one software application executing on the client computing system, one or more cross-platform system maintenance rules that are generated by and sent from a central server computing system, wherein the one or more cross-platform system maintenance rules specify one or more cross-platform system maintenance operations to be performed on the client computing system and further specify scheduling information for performance of the one or more cross-platform system maintenance operations, and wherein the one or more cross-platform system maintenance rules are not specific to any particular type of software operating system, and to determine, by the at least one software application, a type of software operating system currently being executed by the client computing system. The instructions further cause the one or more processors of the client computing system to determine, by the at least one software application, based on the one or more cross-platform system maintenance rules and further based on the type of software operating system currently being executed by the client computing system, one or more platform-specific system maintenance rules that specify one or more platform-specific system maintenance operations to be performed on the client computing system and further specify scheduling information for performance of the one or more platform-specific system maintenance operations, wherein the one or more platform-specific system maintenance rules are specific to the type of software operating system currently being executed by the client computing system, and to determine, by the at least one software application, and based on the scheduling information identified by the one or more platform-specific system maintenance rules, a schedule indicating when to perform the one or more platform-specific system maintenance operations. The instructions further cause the one or more processors of the client computing system to initiate, by the at least one software application, performance of the one or more platform-specific system maintenance operations in accordance with the schedule, and to collect, by the at least one software application, one or more results associated with the performance of the one or more platform-specific system maintenance operations. The instructions further cause the one or more processors of the client computing system to generate, by at least one software application, at least one summary report that includes the one or more results, and to send, by at least one software application and to the central server computing system, the at least one summary report.

In one example, a non-transitory computer-readable storage medium stores instructions that, when executed, cause an attack computing system to perform operations that include receiving, by at least one software application executing on the client computing system, one or more cross-platform system maintenance rules that are generated by and sent from a central server computing system, wherein the one or more cross-platform system maintenance rules specify one or more cross-platform system maintenance operations to be performed on the client computing system and further specify scheduling information for performance of the one or more cross-platform system maintenance operations, and wherein the one or more cross-platform system maintenance rules are not specific to any particular type of software operating system, determining, by the at least one software application, a type of software operating system currently being executed by the client computing system, determining, by the at least one software application, based on the one or more cross-platform system maintenance rules and further based on the type of software operating system currently being executed by the client computing system, one or more platform-specific system maintenance rules that specify one or more platform-specific system maintenance operations to be performed on the client computing system and further specify scheduling information for performance of the one or more platform-specific system maintenance operations, wherein the one or more platform-specific system maintenance rules are specific to the type of software operating system currently being executed by the client computing system, and determining, by the at least one software application, and based on the scheduling information identified by the one or more platform-specific system maintenance rules, a schedule indicating when to perform the one or more system maintenance operations. The operations further include initiating, by the at least one software application, performance of the one or more platform-specific system maintenance operations in accordance with the schedule, and collecting, by the at least one software application, one or more results associated with the performance of the one or more platform-specific system maintenance operations. The operations further include generating, by at least one software application, at least one summary report that includes the one or more results, and sending, by at least one software application, and to the central server computing system, the at least one summary report.

The details of one or more examples are set forth in the accompanying drawings and the description below. Other features, objects, and advantages of the disclosure will be apparent from the description and drawings, and from the claims.

DETAILED DESCRIPTION

Figure 1:
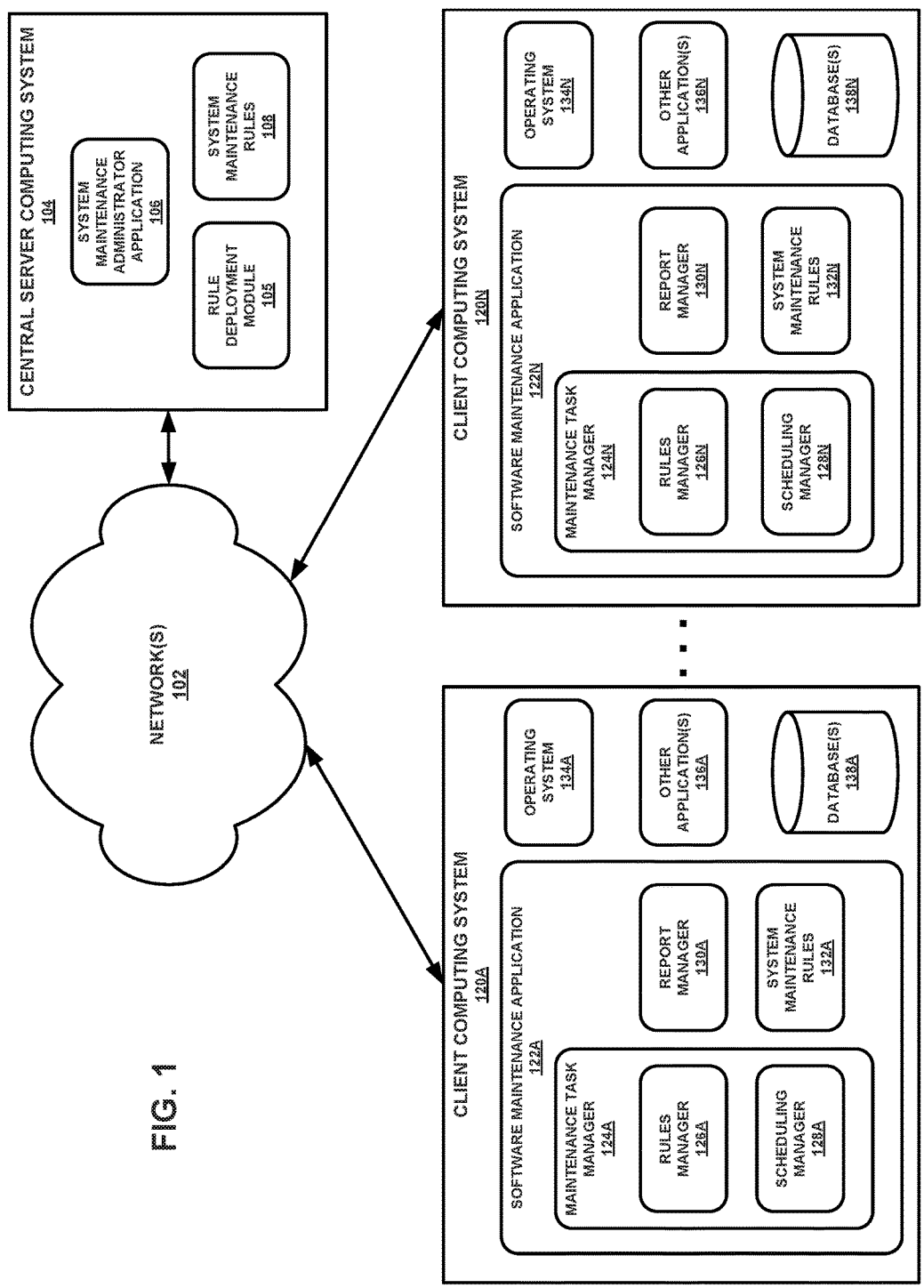
FIG. 1 is a block diagram illustrating an example central server computing system communicatively coupled to one or more client computing systems that are configured to perform automated system maintenance tasks, in accordance with one or more aspects of the present disclosure.

As outlined above, system maintenance may often be time consuming and expensive, and it can cause extensive downtime if done improperly. To avoid improper system maintenance, extensive training is often required for existing systems, with additional training required for new capabilities before they can be deployed. For example, the introduction of a new capability often includes the introduction of new training for system maintainers. Before this new capability can be put into use, a training course must typically be developed and tested. The time for the systems maintainers to take the course must be set aside, and proof of proficiency in maintaining the new system often needs to be established. These processes can significantly delay the deployment of new capabilities. Beyond these, there may also be significant time and financial overhead involved in training for new system maintenance. Gathering and deploying resources for training development, course instructors, training environments, and updates to training materials is often an expensive undertaking.

To address these and other issues associated with existing system maintenance efforts, various techniques of the present disclosure are directed to maintenance software applications that may be executed by remote client computing systems and that may be triggered by events or rules that are provided by a central server computing system. The techniques described herein may leverage features that are built into one or more operating systems that are executed by the client computing systems in order to manage various maintenance activities such as backups, updates, patches, restorations, monitoring, and other system maintenance tasks. The described examples may provide certain technical advantages, such as, for example, leveraging various operating system components (e.g., task scheduling or group policies for Windows, crontab for Linux, application deployment system for Android) to assist in the overall maintenance process to perform system maintenance tasks.

An administrator may use an administrator interface provided by a central server system to create various cross-platform, system-level policies or rules for maintenance tasks that are to be performed across one or more client computing systems communicatively coupled to the server system via one or more networks (e.g., one or more wired/wireless networks). These cross-platform policies or rules may be operating system agnostic and can then be deployed from the central server system to any client systems. Software executing on these client systems is then capable of locally implementing the policies or rules based on the type of operating system used on the respective client systems. The central server system may, in some cases, provide a schedule of maintenance tasks with the deployed policies or rules, where the schedule of maintenance tasks may be associated with corrective and/or preventive actions. The client computing systems may interpret the received policies or rules and identify a set of operating system-specific maintenance tasks that are to be performed on the respective client computing systems at the intervals or times specified by the schedule (e.g., restore-point policy for Windows systems). These client computing systems may utilize software maintenance applications or agents to receive and interpret the cross-platform rules provided by the central server, and to implement maintenance tasks that are specific to the types of operating systems used by these client systems to allow for overall maintenance of complex infrastructures.

The client computing systems may include or otherwise provide one or more services, databases, file systems, operating systems, and/or applications (e.g., medical information system applications) that may be included in, or targets of, the automated system maintenance tasks that are performed by the client computing systems. Examples of such tasks may include, but are not limited to, backup tasks, restoration actions, system updates, patching, directory monitoring, and system integrity checks. In some non-limiting examples, one or more of the client computing systems may include a medical information management system that stores or manages medical electronic health records.

The techniques disclosed herein may enable a central server to maintain a uniform maintenance schedule across all client systems, thereby achieving increased capabilities on both server and client/end-user systems (e.g., desktops, tablets or other mobile systems). Additionally, decreased training for end users and systems maintainers will potentially result in decreased downtime, an increase in availability of system maintenance staff, and faster deployment of new components. The implementation of automated system maintenance tasks on client systems or other end-user devices opens the opportunity to include maintenance tasks that are often left to system maintainers, such as automated restoration after a system failure. This is a task often performed by a trained system maintainer, but which can be automated and performed on a client computing system according to the techniques described herein. The automation of system maintenance tasks may also enable incorporation of maintenance capabilities that are often overlooked by existing maintenance software systems. Group policies, as an example, are a flexible and useful tool for computers on a domain but are often abandoned when not on a domain. The techniques described herein may provide an option to deploy group policies by a central server system as a local group policy to one or more client computing systems, which may be used to configure local policies on these client computing system (e.g., for the creation of restore points), based on the type of operating systems used on such systems, without necessarily requiring a system maintainer to configure such local policies on each client system.

One or more of the techniques described herein provide the technical ability to perform automated maintenance on remote client systems through the use of deployed system maintenance rules provided by a central server. Technical mechanisms are described for facilitating the creation and improved deployment of the maintenance rules, and the local implementation of these rules on individual client computing systems based on the types of operating systems executed by such systems. These techniques may decrease the number of and work of administrative system maintainers through the implementation of such automation. By creating a deployment procedure for various client systems configured in specific manners, the techniques may enable a system maintainer to maintain a significantly higher number of client systems. Additionally, the techniques may provide the technical benefits of potentially decreasing system downtime during peak usage times by allowing portions of system maintenance to be done while system maintainers and other staff members are not on duty. In addition, the techniques may provide consistency to the system maintenance process, since various different client systems may have the same or similar maintenance tasks operating without the chance of forgotten elements or misconfigurations causing an issue. The central server system may maintain, in many instances, a group of cross-platform system maintenance rules that may be deployed to any number of different client computing systems, and these client computing systems may generate platform-specific system maintenance rules from the cross-platform system maintenance rules based on the types of operating systems used by the client computing systems.

FIG. 1 is a block diagram illustrating an example central server computing system 104 that is communicatively coupled to one or more client computing systems 120A-120N (collectively, "client computing systems 120) that are configured to perform automated system maintenance tasks, in accordance with one or more aspects of the present disclosure. As shown in the example of FIG. 1, central server computing system 104 is communicatively coupled to each of client computing systems 120 via one or more networks 102. Networks 102 may comprise one or more wired and/or wireless networks. In certain examples, networks 102 may include one or more low-bandwidth and/or high-bandwidth networks.

Central server computing system 104 and client computing systems 120 may comprise real and/or virtualized systems that each comprise one or more desktop computing devices, mobile computing devices (e.g., mobile phones, tablet computers, personal digital assistants (PDA's), laptop computers, wearable computing devices), and/or other type of computing devices. Central server computing system 104 and client computing systems 120 may each include one or more processors and further include, or be otherwise coupled to, one or more display devices. Central server computing system 104 and client computing systems 120 may each include one or more communication units, which are configured to send and receive data. In some examples, these communication units support wireless and/or wired communication and may send and/or receive data using any variety of communication protocols. In some non-limiting examples, central server computing system 104 may include or otherwise provide hypervisor functionality, and client computing systems 120 may be associated with one or more virtual machines.

Central server computing system 104 may be configured to create, deploy, and maintain system maintenance rules 108 that may be provided to client computing systems 120 during operation. System maintenance rules 108 may, in some cases, comprise cross-platform system maintenance rules that are not specific to any particular type of client computing system or software operating system. In some cases, system maintenance rules 108 may include one or more platform-specific system maintenance rules that are specific to a specific type of client computing system or operation system. Central server computing system 104 may provide system maintenance rules 108 to client computing systems 120, such as via a push or a pull implementation. For instance, central server computing system 104 may push one or more of system maintenance rules 108 to client computing systems 120 (e.g., at a defined time or at defined intervals). In some cases, client computing systems 120 may also be configured to pull one or more of system maintenance rules 108 from central server computing system 104 (e.g., at a defined time or at defined intervals).

Central server computing system 104 may also include a system maintenance administrator application 106. System maintenance administration application 106 may provide an interface for development and deployment of system maintenance rules 108. For example, system maintenance administrator application 106 may provide a graphical user interface that is output for display by central server computing system 104. An administrator of central server computing system 104 may use such a graphical user interface to develop and define one or more of system maintenance rules. In some cases, this administrator may be a system maintainer or other user who is able to create or design such rules.

The graphical user interface provided by system maintenance administrator application 106 may include various selectable fields, menus, or other objects that may be used by the administrator to select tasks and design one or more of system maintenance rules 108. For example, the administrator may select certain maintenance rules using a set of drop-down selection menus. The administrator may select how to configure such rules using the menus, including a selection of which information is to be reported by or output from tasks that implement the rules, as well as which client computing systems will receive the rules via deployment. The rules created by system maintenance administrator application 106 may be stored in system maintenance rules 108, and rule deployment module 105 of central server computing system 104 may be configured to deploy one or more of system maintenance rules 108 to client computing systems 120.

As an example, an administrator could select a rule associated with a backup task from a menu using the graphical user interface. The administrator could then utilize the interface to configure the rule to specify scheduling information, such as how often to run the backups (e.g., once per week, once per day), as well as the time or time period during which to run the backups. The administrator may further configure the rule to specify how or where to store the backup (e.g., locally on client computing systems 120, on a network share, on central server computing system 104). The administrator may also configure the rule to specify what type of reporting information associated with the backup operations should be logged and/or reported back to central server computing system 104 (e.g., the size of the backup, the last time the backup was run). Finally, the administrator may configure the rule to specify which of client computing systems 120 on which the rule is to be provided and run (e.g., as selected from a list of computing systems or by running a small query to determine which client computing systems 120 will implement the rule).

Rules that may be designed or created using system maintenance administrator application 106 may be stored in system maintenance rules 108. Central server computing system 104 also includes a rule deployment module 105 that is configured to deploy one or more of system maintenance rules 108 to one or more of client computing systems 120 via networks 102. In some cases, rule deployment module 105 may implement a push model to push one or more of system maintenance rules 108 to client computing systems 120. In other cases, client computing systems 120 may implement a pull model to retrieve one or more of system maintenance rules 108 from rule deployment module 105. Non-limiting examples of the push or pull interface between central server computing system 104 and client computing system 120A may include a secure socket shell interface, an interface utilizing remote server administration tools, or other interfaces utilizing remote execution tools.

Rule deployment module 105 may deploy system maintenance rules 108 at defined or specified times. For instance, in some cases, once system maintenance administrator application 106 has created a new rule that is included in system maintenance rules 108, rule deployment module 105 may deploy the new rule to one or more of client computing systems 120. Rule deployment module 105 may deploy the new rule to all or a subset of client computing systems 120, depending on the specifications of the new rule. For example, the new rule may indicate that it is to be deployed on all currently available client systems. However, in some cases, the new rule may specify only particular ones of client computing systems 120 (e.g., client computing system 120A and 120N) that are to receive the new rule. In these cases, rule deployment module 105 may only deploy the new rule to these particular ones of client systems 120. The new rule may also, in some instances, specify a time for deployment. As an example, the new rule may specify a deployment time of 8:00 am on Monday morning. In this example, rather than immediately deploying the new rule, rule deployment module 105 may wait to deploy the new rule at the specified time.

System maintenance rules 108 may comprise one or more cross-platform system maintenance rules that identify one or more cross-platform system maintenance operations to be performed on one or more of client computing systems 120. Client computing systems 120 may each implement their own respective specific instances or types of operating systems, and system maintenance rules 108 provided by central server computing system 104 may be implemented on one or more of client computing systems 120. As a result, the cross-platform system maintenance rules are not necessarily specific to any particular type of software operating system implemented by one or more of client computing systems 120. In addition to identifying the cross-platform system maintenance operations to be performed, the cross-platform system maintenance rules also identify scheduling information for performance of these operations. In some examples, system maintenance rules 108 may be provided in binary, text, script, or other format. In some cases, system maintenance rules 108 may comprise one or more platform-specific system maintenance rules that identify one or more platform-specific system maintenance operations to be performed on one or more of client computing systems 120.

Rule deployment module 105 is capable of deploying one or more cross-platform system maintenance rules to any of client computing systems 120. In those instances in which system maintenance rules 108 include one or more platform-specific system maintenance rules, rule deployment module 105 first determines which of client computing systems 120 are configured to receive and use such platform-specific rules (e.g., based on determining which types of operating systems are used by each of client computing systems 120). Upon making such a determination, rule deployment module 105 deploys the platform-specific system maintenance rules only to those of client computing systems 120 that are configured to receive and use these platform-specific rules.

As shown in FIG. 1, each of client computing systems 120 includes a local software maintenance application, a software operating system, one or more other applications, and one or more databases. For example, as illustrated, client computing system 120A includes a software maintenance application 122A, a software operating system 134A, one or more other applications 136A, and one or more databases 138A. Similarly, client computing system 120N includes a software maintenance application 122N, a software operating system 134N, one or more other applications 136N, and one or more databases 138N. Each client computing system 120A, 120B may execute its own instance and/or type of operating system. For instance, operating system 134A executed by client computing system 120A may be an operating system of a first type (e.g., Windows, Linux, Android), and operating system 134B executed by client computing system 120B may be an operating system of a second type (e.g., Windows, Linux, Android), where the first and second types may be the same or different types of operating systems. Each of client computing systems 120A and 120B may also execute one or more other respective applications 136A, 136B during operation (e.g., one or more of a medical systems application, contact manager application, a fitness application, a calendar application, a personal assistant, a search application, a camera application, a map or navigation application, a weather application, a smart television application, a transportation service application, a social media application, a camera application, a game application, an e-mail application, a chat or messaging application, an Internet browser application).

Each of central server computing system 104 and client computing systems 120 may execute one or more software applications. For example, central server computing system 104 may execute system maintenance administrator application 106 and rule deployment module 105. Client computing system 120A may execute software maintenance application 122A, operating system 134A, and/or other applications 136A. Client computing system 120N may execute software maintenance application 122N, operating system 134N, and/or other applications 136N.

The software maintenance application executed by a given one of client computing systems 120 includes various other modules and/or software applications. For example, as illustrated in FIG. 1, software maintenance application 122A includes a maintenance task manager 124A, a report manager 130A, and system maintenance rules 132A, where maintenance task manager 124A further includes a rules manager 126A and a scheduling manager 128A. Software maintenance application 122N includes a maintenance task manager 124N, a report manager 130N, and system maintenance rules 132N, where maintenance task manager 124N further includes a rules manager 126N and a scheduling manager 128N.

Each software maintenance application executed by one of client computing systems 120 is operable to communicate with rule deployment module 105 and/or system maintenance administrator application 106 of central server computing system 104 via networks 102. For example, software maintenance application 122A may be configured to receive one or more of system maintenance rules 108 deployed by rule deployed by rule deployment module 105. In some cases, software maintenance application 122A may receive rules that are pushed out by rule deployment module 105. In other cases, software maintenance application 122A may implement a pull model to request receipt of the rules from rule deployment module 105.

Maintenance task manager 124A of software maintenance application 122A may be configured to receive and process the incoming ones of system maintenance rules 108 received from rule deployment module 105. For example, maintenance task manager 124A (e.g., using rules manager 126A) may parse, interpret, or otherwise process system maintenance rules 108 received from rule deployment module 105, and may store specific system maintenance rules 132A that may be implemented by client computing system 120A and operating system 134A. As outlined above, system maintenance rules 108 deployed by rule deployment module 105 of central server computing system 104 may include cross-platform system maintenance rules that are not specific to any particular type of operating system. Rules manager 126A of maintenance task manager 124A is configured to process these cross-platform system maintenance rules and determine platform-specific system maintenance rules 132A for storage and use by client computing system 120A. Rules manager 126A determines these platform-specific system maintenance rules 132A based upon a determination of the type of operating system 134A currently being executed by client computing system 120A. System maintenance rules 132A specify one or more platform-specific system maintenance operations that may be performed by client computing system 120A, and they may further specify scheduling information for performance of these platform-specific system maintenance operations. System maintenance rules 132A and the platform-specific system maintenance operations are specific to the type of operating system 134A.

For example, if operating system 134A is of a first type (e.g., a Windows operating system), rules manager 126A may convert cross-platform system maintenance rules 108 received from central server computing system 104 into platform-specific system maintenance rules 132A that are specific to the first type of operating system 134A. If, however, operating system 134A is of a second type (e.g., a Linux operating system), rules manager 126A may convert cross-platform system maintenance rules 108 into platform-specific system maintenance rules 132A that are specific to the second type of operating system 134A. In some instances, rules manager 126A may automatically generate one or more scripts that are configured to implement the platform-specific system maintenance rules 132A that have been generated from the cross-platform system maintenance rules 108. Rules manager 126A may store these scripts with system maintenance rules 132A and/or in databases 138A, which may be executed by scheduling manager 128A. In some cases, as described above, rule deployment module 105 may deploy one or more platform-specific system maintenance rules that are specific to the type of client computing system or operating system. In these cases, rules manager 126A may receive such platform-specific system maintenance rules from rule deployment module 105 are store such rules in system maintenance rules 132A.

In order to perform the platform-specific system maintenance operations associated with platform-specific system maintenance rules 132A, maintenance task manager 124A may utilize scheduling manager 128A. Scheduling manager 128A may determine, based on the scheduling information identified by platform-specific system maintenance rules 132A, a schedule indicating when to perform the one or more platform-specific system maintenance operations. In various examples, the schedule may be a time-based and/or an event-based schedule. A time-based schedule may identify one or more times at which to perform the one or more platform-specific system maintenance operations. For example, if the platform-specific system maintenance operations are system backup operations, the time-based schedule may indicate that the backup operations are to be performed every Friday evening at 8 pm. An event-based schedule may identify one or more events that cause or otherwise trigger performance of the one or more platform-specific system maintenance operations.

Scheduling manager 128A may use the schedule to determine when to initiate performance of the one or more platform-specific system maintenance operations (e.g., by executing scripts that have been previously generated by rules manager 126A, as described above). In the example above, if the schedule is a time-based schedule, scheduling manager 128A may determine to initiate a platform-specific backup operation, which is specific to the type of operating system 134A executing on client computing system 120A, every Friday evening at 10 pm. Software maintenance application 122A may also utilize report manager 130A to collect one or more results associated with the performance of the one or more platform-specific system maintenance operations, such as actions taken, results of such actions, and whether such results are successful and/or acceptable. For example, in the operations comprise backup operations, report manager 130A may collect results associated with the performance of these backup operations, such as which backup operations were performed, when the operations were performed, which files were backed up, and/or the success or failure of such backup operations. Report manager 130A may be configured to generate at least one summary report that includes the one or more results, and may also send the at least one summary report to system maintenance administrator application 106 on central server computing system 104.

In some cases, the amount of information and/or detail included in the summary reports provided by report manager 130A may be dependent on the type of network connection between client computing system 120A and central server computing system 104 via networks 102. For instance, in some cases, networks 102 may include one or more low-bandwidth networks through which client computing system 120A and central server computing system 104 communicate. In these cases, report manager 130A may determine that the communication channel with central server computing system 104 comprises these low-bandwidth networks, and may include a smaller amount of information in the summary reports that are sent back to system maintenance administrator application 106. These summary reports may include higher-level summary information associated with the performance of system maintenance operations that have been performed on client computing system 120A.

However, in other cases, where report manager 130A determines that the communication channel with central server computing system 104 comprises one or more higher-bandwidth networks, report manager 130A may include higher-level information and also more detailed, lower-level information (e.g., detailed log/event information) in the summary reports that it sends back to system maintenance administrator application. In such fashion, in various examples, report manager 130A is capable of customizing the summary report information based on the type of network communication between client computing system 120A and central server computing system 104. In addition, if client computing system 120A loses communication with central server computing system 104 via networks 102 at any point in time, report manager 130A is capable of sending report information back to system maintenance administrator application 106 of central server computing system 104 once connectivity has been re-established.

Upon receiving such summary reports, system maintenance administrator application 106 is configured to output representations of such reports (e.g., via a graphical user interface) to administrators or maintainers of central server computing system 104. By reviewing and analyzing these reports, the administrators or maintainers of central server computing system 104 may obtain a more comprehensive view of the status of system maintenance operations that are performed across the set of one or more client computing systems 120 over time, and may enable proper auditing of system modifications.

As described above, one example of a system maintenance operation that may be performed by client computing system 120A may be a backup operation, or multiple backup operations performed at specified times. Depending on the type of cross-platform system maintenance rules 108 that are deployed by rule deployment module 105 to client computing systems 120, and the type of platform-specific system maintenance rules 132A that are generated by rules manager 126A, scheduling manager 128A may perform various different types of system maintenance operations. For instance, scheduling manager 128A may perform backup operations, system update operations, restoration operations, patching operations, directory monitoring operations, and/or system integrity operations, to name a few non-limiting examples.

Figure 3:
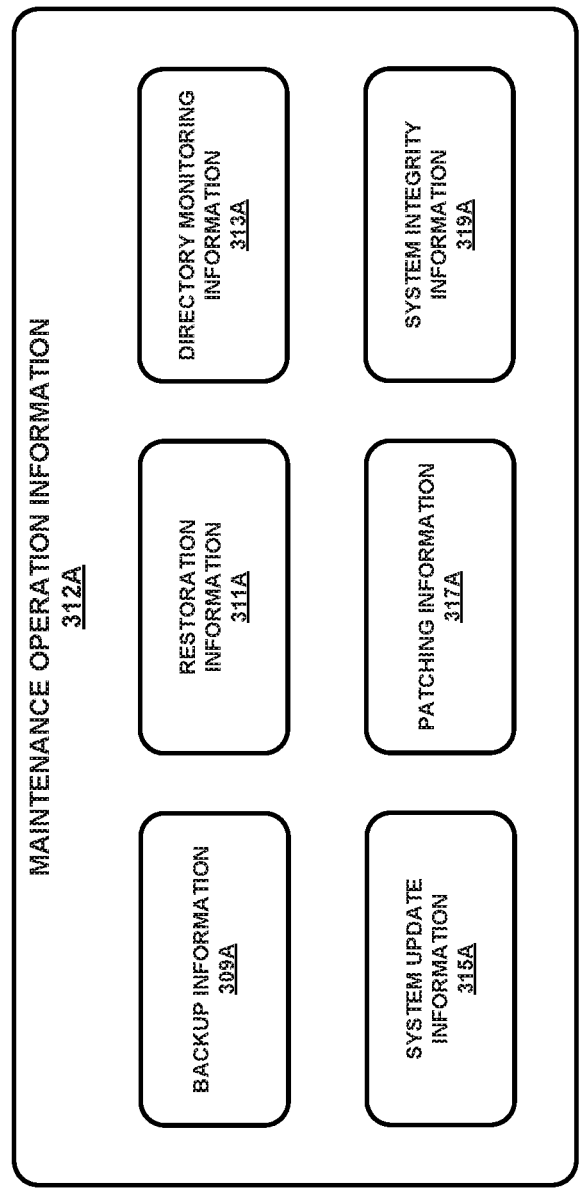
FIG. 3 is a block diagram illustrating one or more examples of maintenance operation information that may be used by the central server computing system shown in FIG. 1 or FIG. 2, in accordance with one or more aspects of the present disclosure.

An administrator or system maintainer may use system maintenance administrator application 106 to design or create one or more of system maintenance rules 108 for these types of operations, such as shown in the example of FIG. 3. Client computing system 120A may perform one or more backup operations to back up files, data, applications, and other information stored or utilized by client computing system 120A. Backups may be stored locally on client computing system 120A and/or on one or more remote systems, such as central server computing systems 104 or other systems that are communicatively coupled to networks 102. Client computing system 120A may also perform restoration operations to restore files, data, applications, or other information from backups (e.g., when such information has become corrupted or outdated). In some cases, client computing system 120A may perform system update and/or patching operations to obtain system updates and/or patches from central server computing system 104 for files, data, applications, or other information stored or utilized by client computing system 120A. In addition, client computing system 120A may perform directory monitoring and/or system integrity operations to monitor files, data, applications, or other information on client computing system 120A. Further descriptions of system maintenance operations will be provided in more detail below.

One or more databases 138A of client computing system 120A may store instructions, data, or other information associated with any of software maintenance application 122A, operating system 134A, and/or other applications 136A. Databases 138A may also store system maintenance rules 132A used by software maintenance application 122A.

As described above, client computing system 120N may include functionality that is similar to that of client computing system 120A. Thus, software maintenance application 122N, maintenance task manager 124N, rules manager 126N, scheduling manager 128N, report manager 130N, system maintenance rules 132N, operating system 134N, other applications 136N, and databases 138N may be similar to software maintenance application 122A, maintenance task manager 124A, rules manager 126A, scheduling manager 128A, report manager 130A, system maintenance rules 132A, operating system 134A, other applications 136A, and databases 138A shown in FIG. 1.

In various examples, because both central server computing system 104 and client computing systems 120 can be used for updates to policies and rules, one or more of client computing systems 120 can be absent from the maintenance process for a period of time and then be reintroduced and receive updates from rule deployment module 105 upon reintroduction. For example, one or more of client computing systems 120 may go down, be pulled offline, or otherwise have no communications with central server computing system 104 via network for a period of time. However, once these systems came back online or otherwise restore communications with central server computing system 104, these systems can again receive updates for system maintenance rules from rule deployment module 105. Thus, if one or more new rules in system maintenance rules 108 have been created during the time these systems were offline, rule deployment module 105 is capable of providing these rules to the systems once they come back online (e.g., either via a push or pull model). Rule deployment module 105 is also capable of automatically pushing out certain rules (e.g., urgent or important rules) to client computing systems 120 on an ad hoc basis, depending on the type of rules, their importance, scheduling information, or other factors.

Figure 2:
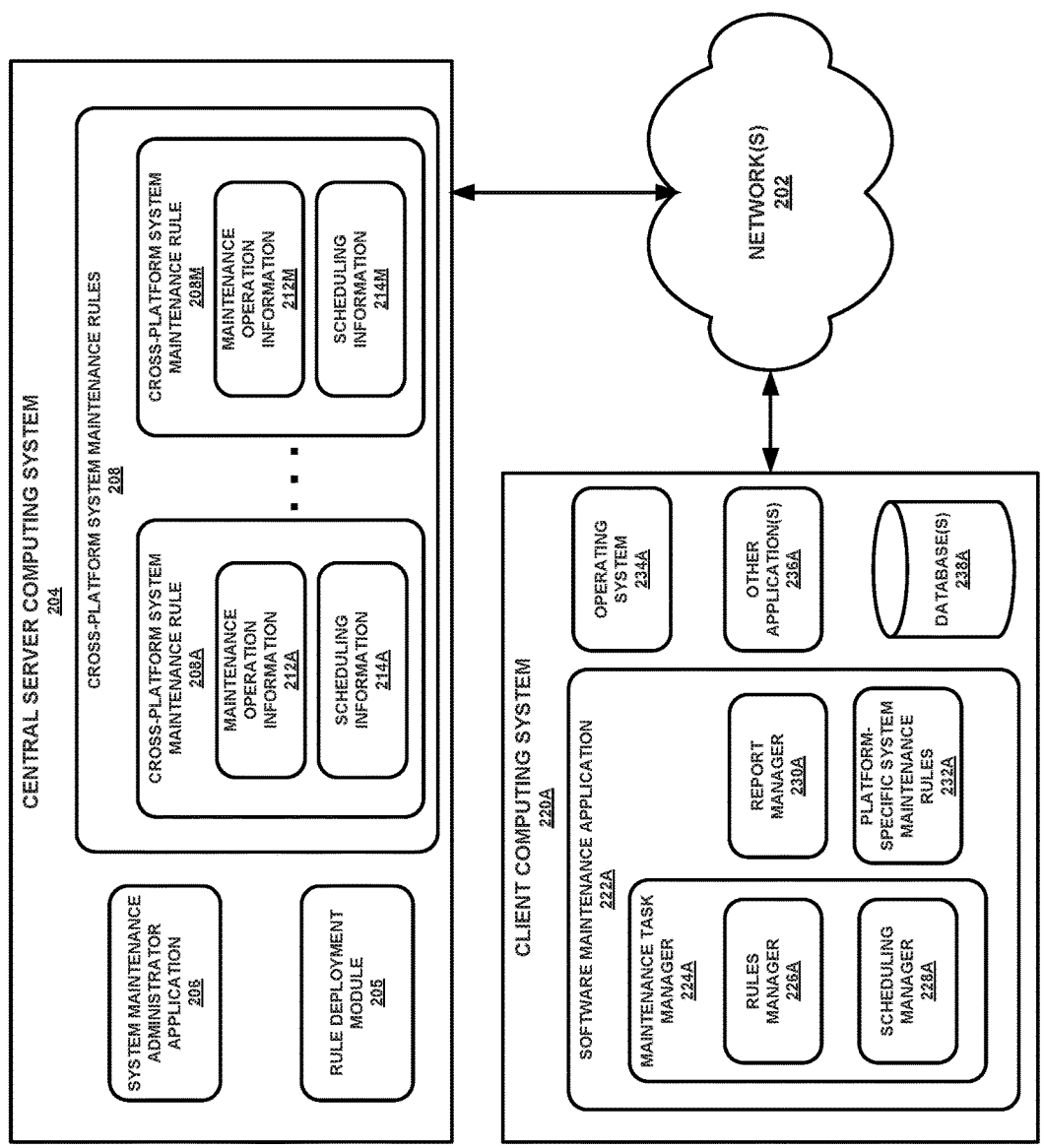
FIG. 2 is a block diagram illustrating another example of a central server computing system communicatively coupled to an example client computing system that is configured to perform automated system maintenance tasks, in accordance with one or more aspects of the present disclosure.

FIG. 2 is a block diagram illustrating another example of a central server computing system 204 communicatively coupled to an example client computing system 220A that is configured to perform automated system maintenance tasks, in accordance with one or more aspects of the present disclosure. Central server computing system 204 may be one example of central computing system 104 shown in FIG. 1, and client computing system 220A may be one example of client computing system 120A shown in FIG. 1. Central server computing system 204 is communicatively coupled to client computing system 220A via one or more networks 202. Networks 202 may be one example of networks 102 shown in FIG. 1.

As illustrated in FIG. 2, central server computing system 204 includes a system maintenance administrator application 206, a rule deployment module 205, and one or more cross-platform system maintenance rules 208A-208M (collectively, "cross-platform system maintenance rules 208"). System maintenance administrator application 206 may be one example of system maintenance administrator application 106 in FIG. 1, rule deployment module 205 may be one example of rule deployment module 105 in FIG. 1, and cross-platform system maintenance rules 208 may be one example of system maintenance rules 108 in FIG. 1.

Cross-platform system maintenance rules 208 are rules that specify one or more cross-platform system maintenance operations to be performed on client computing system 220A. Cross-platform system maintenance rules 208 also specify scheduling information for performance of the cross-platform system maintenance operations. As illustrated in FIG. 2, each of cross-platform system maintenance rules 208 that are generated by system maintenance administrator application 206 may include maintenance operation information and scheduling information. Cross-platform system maintenance rules 208A includes maintenance operation information 212A and scheduling information 214A. Similarly, cross-platform system maintenance rule 208M includes maintenance operation information 212M and scheduling information 214M. In certain non-limiting examples, cross-platform system maintenance rules 208 may specify or provide one or more group-level policies. When client computing systems receive and process such group-level policies, they may convert them into local-based policies that are local to these client systems. For example, client computing system 220A may convert any group-level policies from cross-platform system maintenance rules 208 into local policies for platform-specific system maintenance rules 232A that are stored on client computing system and that are specific to the client computing system 220A and the platform provided by operation system 234A executed by client computing system 220A.

Maintenance operation information 212A may include specific information for with the maintenance operation that is associated with cross-platform system maintenance rule 208A. Examples of maintenance operation information 212A are illustrated in FIG. 3. As one example, if cross-platform system maintenance rule 208A is a rule for performing backup operations, maintenance operation information 212A may include more detailed information associated with the rule and the backup maintenance operation. For instance, maintenance operation information 212A may include information associated with which type of backup is to be performed, how the backup is performed, which files/directories/data/applications/etc. are to be backed up, what type of reporting information is to be generated during the backup process, and which client systems will perform the backup (e.g., client computing system 220A). Cross-platform system maintenance rule 208A also includes scheduling information 214A. Scheduling information 214A may include information associated with the timing of the maintenance operation. In the case of backups, scheduling information 214A may specify when backup operations are to take place, and how often (if applicable) they are to take place. For instance, scheduling information 214A may specify that the backup operation is to be performed every Sunday night at 10 pm.

As another example, if cross-platform system maintenance rule 208A is a rule for performing system update or patch operations, maintenance operation information 212A may include more detailed information associated with the rule and the system update or patch maintenance operation. For instance, maintenance operation information 212A may include information associated with the type of system update or patch that is being implemented, which particular files/data/applications/other information is updated or changed based on the system update or patch, when the system update or patch operations are performed, how the operations are performed, what type of reporting information is to be generated during the process, and which client systems will perform the update or patch operations (e.g., client computing system 220A). Scheduling information 214A may include information associated with the timing of the maintenance operation. In the case of system updates or patch operations, scheduling information 214A may specify when these operations are to take place, and how often (if applicable) they are to take place. For instance, scheduling information 214A may specify that the client computing system 220A should check for updates or patches once per week (e.g., Monday mornings at 6 am). At these times, client computing system 220A may send a request to central server computing system 204 and/or other remote systems to identify any updates or patches that may be needed for downloading to client computing system 220A. Client computing system 220A may only request information about specific updates or patches (e.g., for particular files/applications/data), or may request information generally about any updates or patches that may be available for download. For example, client computing system 220A may request information about specific updates or patches for the operating system 234A that is currently being executed. If any updates or patches are identified, client computing system 220A may then download and install these updates or patches.

As another example, if cross-platform system maintenance rule 208A is a rule for performing restoration operations, maintenance operation information 212A may include more detailed information associated with the rule and the restoration maintenance operation. For instance, maintenance operation information 212A may include information associated with the type of restoration action that is being implemented, which particular files/directories/data/applications/other information are to be restored, when the restoration operations are performed, how the operations are performed (e.g., perform a restoration of information that was backed up one week prior), what type of reporting information is to be generated during the process, and which client systems will perform the restoration operations (e.g., client computing system 220A). Restoration operations may be performed responsive to client computing device 220A identifying, e.g., errors, viruses, corrupt files, or other issues local to client computing device 220A. Scheduling information 214A may include information associated with the timing of the maintenance operation. In the case of restoration operations, scheduling information 214A may specify when these operations are to take place. For instance, scheduling information 214A may specify that the client computing system 220A should perform restoration operations on an ad hoc basis (e.g., as soon as error or other issue is identified). In some cases, scheduling information 214A may specify that restoration operations are to take place at defined times or timeframes after any such errors or issues are identified.

As another example, if cross-platform system maintenance rule 208A is a rule for performing monitoring or system integrity operations, maintenance operation information 212A may include more detailed information associated with the rule and the maintenance operation. For instance, maintenance operation information 212A may include information associated with the type of monitoring or system integrity action that is being implemented, which particular files/data/applications/other information are to be checked, when/how the operations are performed, how the operations are performed (e.g., checking certain checksums on files once per hour, checking for changes to files/data/applications that are unexpected, checking for file deletions that are unexpected, checking/scanning disks for errors or other issues), what type of reporting information is to be generated during the process, and which client systems will perform the restoration operations (e.g., client computing system 220A). Scheduling information 214A may include information associated with the timing of the maintenance operation, such as when these operations are to take place. In some cases, scheduling information 214A may specify that these operations are to take place on an ad hoc basis or at defined times or timeframes.

Cross-platform system maintenance rules 208 that are stored on central server computing system 204 includes one or more such rules 208A-208M. Each of these rules may include maintenance operation information and scheduling information such as described above. Thus, similar to cross-platform system maintenance rule 208A, cross-platform system maintenance rule 208M includes maintenance operation information 212M and scheduling information 214M.

Client computing system 220A is communicatively coupled to central server computing system 204 via one or more networks 202. Similar to client computing system 120A shown in FIG. 1, client computing system 220A includes a software maintenance application 222A, an operating system 234A, one or more other applications 236A, and one or more databases 238A. Software maintenance application 222A includes maintenance task manager 224A and report manager 230A. Maintenance task manager 224A includes rules manager 226A and scheduling manager 228A. These are similar to the corresponding components shown in FIG. 1 for client computing system 220A.

Software maintenance application 222A also includes platform-specific system maintenance rules 232A. Maintenance task manager 224A of software maintenance application 222A may be configured to receive and process the incoming ones of cross-platform system maintenance rules 208 received from rule deployment module 205. For example, maintenance task manager 224A may parse, interpret, or otherwise process these cross-platform system maintenance rules 208 received from rule deployment module 205, and may store platform-specific system maintenance rules 232A that may be implemented by client computing system 220A and operating system 234A. Cross-platform system maintenance rules 208 are not specific to any particular type of operating system. However, rules manager 226A is configured to process these cross-platform rules and determine platform-specific system maintenance rules 232A for storage and use by client computing system 120A. Rules manager 226A determines these platform-specific system maintenance rules 232A based upon a determination of the type of operating system 234A currently being executed by client computing system 220A. Platform-specific system maintenance rules 232A and the platform-specific system maintenance operations are specific to the type of operating system 234A.

For example, if operating system 234A is of a first type (e.g., a Windows operating system), rules manager 226A may convert cross-platform system maintenance rules 208 received from central server computing system 204 into platform-specific system maintenance rules 232A that are specific to this first type of operating system 234A (e.g., use of restore points for Windows backup operations). If, however, operating system 234A is of a second type (e.g., a Linux operating system), rules manager 226A may convert cross-platform system maintenance rules 208 into platform-specific system maintenance rules 232A that are specific to this second type of operating system 234A. In some instances, rules manager 226A may automatically generate one or more scripts that are configured to implement the platform-specific system maintenance rules 232A that have been generated from the cross-platform system maintenance rules 208. Rules manager 226A may store these scripts with system maintenance rules 232A and/or in databases 238A, which may be executed by scheduling manager 228A.

FIG. 3 is a block diagram illustrating one or more examples of maintenance operation information 312A that may be used by central server computing system 104 shown in FIG. 1 and/or central server computing system 204 shown in FIG. 2, in accordance with one or more aspects of the present disclosure. For instance, maintenance operation information 312A may be one example of maintenance operation information 212A or maintenance operation information 212M shown in FIG. 2, where maintenance operation information 212A is included in cross-platform system maintenance rule 208A stored by central server computing system 204, and where maintenance operation information 212M is included in cross-platform system maintenance rule 208M stored by central server computing system 204.

Similar to maintenance operation information 212A and maintenance operation information 212M, maintenance operation information 312A may, along with scheduling information, be included in a cross-platform system maintenance rule that is stored by a central server computing system and deployed to a client computing system. Maintenance operation information 312A may include specific information for with the maintenance operation that is associated with a cross-platform system maintenance rule, and examples of maintenance operation information 312A are illustrated in FIG. 3. For instance, maintenance operation information 312A may include one or more of backup information 309A, restoration information 311A, directory monitoring information 313A, system update information 315A, patching information 317A, and/or system integrity information 319A. Because maintenance operation information 312A is part of a cross-platform system maintenance rule, maintenance operation information 312A may not, in various examples, including any platform-specific maintenance operation information. In some cases, maintenance operation information 312A may include platform-specific maintenance operation information for a multitude of different platforms, such that a client computing system that receives maintenance operation information 312A may select the particular platform-specific maintenance operation information that corresponds to the type of platform provided by that client computing system.

Backup information 309A may include information associated with which type of backup is to be performed, how the backup is performed, which files/data/applications/etc. are to be backed up, what type of reporting information is to be generated during the backup process, and which client systems will perform the backup (e.g., client computing system 220A). Scheduling information associated with backup information 309A may include information specifying the timing of a backup operation. For instance, this scheduling information may specify when backup operations are to take place, and how often (if applicable) they are to take place. As one non-limiting example, backup information 309A and/or associated scheduling information may specify that a backup operation is to take place every Friday evening at 8 pm, and may further specify which files/data/applications are to be backed up, which type of reporting information is to be generated (e.g., log information, success/fail information, status information), and which client systems will perform the backup. Backup information 309A may also specify if the backup operation corresponds to a full and complete backup of all specified information, or only a partial backup of select information or information that has changed since a prior backup was performed.

Upon receiving backup information 309A (e.g., in one or more of cross-platform system maintenance rules 208 provided by rule deployment module 205 of central server computing system 204), as well as associated scheduling information (e.g., scheduling information 214A), a client computing system such as client computing system 220A may process such information to generate platform-specific system maintenance rules. For example, rules manager 226A of software maintenance application 222A may utilize backup information 309A to generate one or more of platform-specific system maintenance rules 232A that are specific to operating system 234A. These rules may specify platform-specific backups operations that are to be performed by client computing system 220A, and may also specify scheduling information for performance of these platform-specific backup operations. Scheduling manager 228A may determine a schedule indicating when to perform the platform-specific backup operations, and initiate performance of these operations in accordance with the schedule.

For example, rules manager 226A may generate one or more platform-specific rules that specify backup operations that are specific to the Windows operating system through the use of restore points. These rules may identify which particular files/data/applications/etc. are to be backed up, what type of reporting information is to be generated during the backup process, and when the backup operations are to take place (e.g., every Friday night at 8 pm). The rules may also specify any other particular logistics or procedural information for backup operations that are particular and specific to the Windows operating system, as opposed to other types of operating systems (e.g., Linux, Android). Each time scheduling manager 228A performs the backup operations (e.g., once per week), report manager 230A may collect one or more results associated with the performance of the platform-specific backup operations, and generate one or more summary report that includes the one or more results. Report manager 230A may then send these reports to system maintenance administrator application 206 for use by an administrator or maintainer of central server computing system.

Restoration information 311A may include detailed information associated with the rule restoration maintenance operations. For instance, restoration information 311A may include information associated with the type of restoration action that is being implemented, which particular files/data/applications/other information are to be restored, when the restoration operations are performed, how the operations are performed (e.g., perform a restoration of information that was backed up one week prior), what type of reporting information is to be generated during the process, and which client systems will perform the restoration operations (e.g., client computing system 220A). Restoration operations may be performed responsive to a client computing device identifying, e.g., errors, viruses, corrupt files, or other issues local to the client computing device. Scheduling information associated with restoration information 311A may specify when restoration operations are to take place. For instance, the scheduling information may specify that the client computing system should perform restoration operations on an ad hoc basis (e.g., as soon as error or other issue is identified), or at defined times or timeframes after any such errors or issues are identified. Restoration information 311A may also indicate which files/data/applications/etc. are to be restored, how the operations are performed (e.g., restore the indicated information based on backups that were performed one week prior), and the type of reporting information that is to be collected by the client computing system and send back to the central server.

Upon receiving restoration information 311A, as well as associated scheduling information, rules manager 226A may utilize restoration information 311A to generate one or more of platform-specific system maintenance rules 232A that are specific to operating system 234A. These rules may specify platform-specific restoration operations that are to be performed by client computing system 220A, and may also specify scheduling information for performance of these platform-specific restoration operations. Scheduling manager 228A may determine a schedule (e.g., an event-based schedule) indicating when to perform the platform-specific restoration operations, and initiate performance of these operations in accordance with the schedule. As an example, rules manager 226A may generate one or more platform-specific rules that specify restoration operations that are specific to the Windows operating system through the use of restore points. The rules may also specify any other particular logistics or procedural information for restoration operations that are particular and specific to the Windows operating system, as opposed to other types of operating systems (e.g., Linux, Android).

Rules manager 226A may also utilize directory monitoring information 313A, system update information 315A, patching information 317A, and/or system integrity information 319A to generate one or more of platform-specific system maintenance rules 232A that are specific to operating system 234A. Scheduling manager 228A may determine a schedule indicating when to perform these platform-specific operations, and initiate performance of these operations in accordance with the schedule. The rules may specify any other particular logistics or procedural information for operations that are particular and specific to operating system 234A.

Maintenance operation information 312A may also include system update information 315A and patching information 317A. System update information 315A and/or patching information 317A may include information associated with system update and/or patch maintenance operations. For instance, system update 315A may include information associated with the type of system update that is being implemented, which particular files/data/applications/other information to be updated or changed based on the system update, when the system update operations are performed, how the operations are performed, what type of reporting information is to be generated during the process, and which client systems will perform the update operations (e.g., client computing system 220A). Patching information 317A may include similar information for patch operations. System updates are typically associated with updates or changes to files, data, applications, or other information on a client system in the general sense. Patches are typically associated with fixes, corrections, or changes to files, data, applications, or other information based on identified errors, bugs, problems, or other issues with previous versions of such information. In some cases, system update information 315A may be combined with patching information 317A.

Scheduling information associated with system update information 315A and/or patching information 317A may specify when these operations are to take place, and how often (if applicable) they are to take place. For instance, the scheduling information may specify that the client computing system should check for updates or patches once per week (e.g., Monday mornings at 6 am). At these times, the client computing system may send a request to the central server computing system (e.g., central server 204) and/or other remote systems to identify any updates or patches that may be needed for downloading to the client computing system. In some cases, if the client computing system encounters an issue with a file/application/etc., scheduling information may specify that the client computing system should request a patch on an ad hoc basis (e.g., immediately upon identifying the issue, or a defined time interval after identifying the issue).

System update information 315A and/or patching information 317A may indicate whether the system update or patching operations are performed automatically or in response to user input, as well as the type of reporting information that is to be collected by the client computing system. The reporting information may include information as to what updates or patches were installed, when they were installed, and other associated information (e.g., bug or error information encountered by the client prior to installing a patch).

Client computing system 220A may only request information about specific updates or patches (e.g., for particular files/applications/data), or may request information generally about any updates or patches that may be available for download. For example, client computing system 220A may request information about specific updates or patches for the operating system 234A that is currently being executed. If any updates or patches are identified, client computing system 220A may then download and install these updates or patches.

Maintenance operation information 312A may also include directory monitoring information 313A and/or system integrity information 319A. Directory monitoring information 313A may include information associated with the type of monitoring action that is being implemented, which particular files/data/applications/other information are to be checked, when/the operations are performed, how the operations are performed, what type of reporting information is to be generated during the process, and which client systems will perform the restoration operations (e.g., client computing system 220A). System integrity information 319A may include similar information for system integrity maintenance operations. Scheduling information associated with directory monitoring information 313A and/or system integrity information 319A may specify the timing of these types of maintenance operations. In some cases, the scheduling information may specify that these operations are to take place on an ad hoc basis or at defined times or timeframes.

As an example, directory monitoring information 313A and/or system integrity information 319A may specify particular types of monitoring or system integrity operations (e.g., checking certain checksums on files once per hour, checking for changes to particular files/data/applications, checking for deletions of particular files/data/applications, checking and/or scanning disks for errors or other issues). Directory monitoring information 313A and/or system integrity information 319A may also indicate the type of reporting information to be collected by the client computing system and sent back to the central server.

Figure 4:
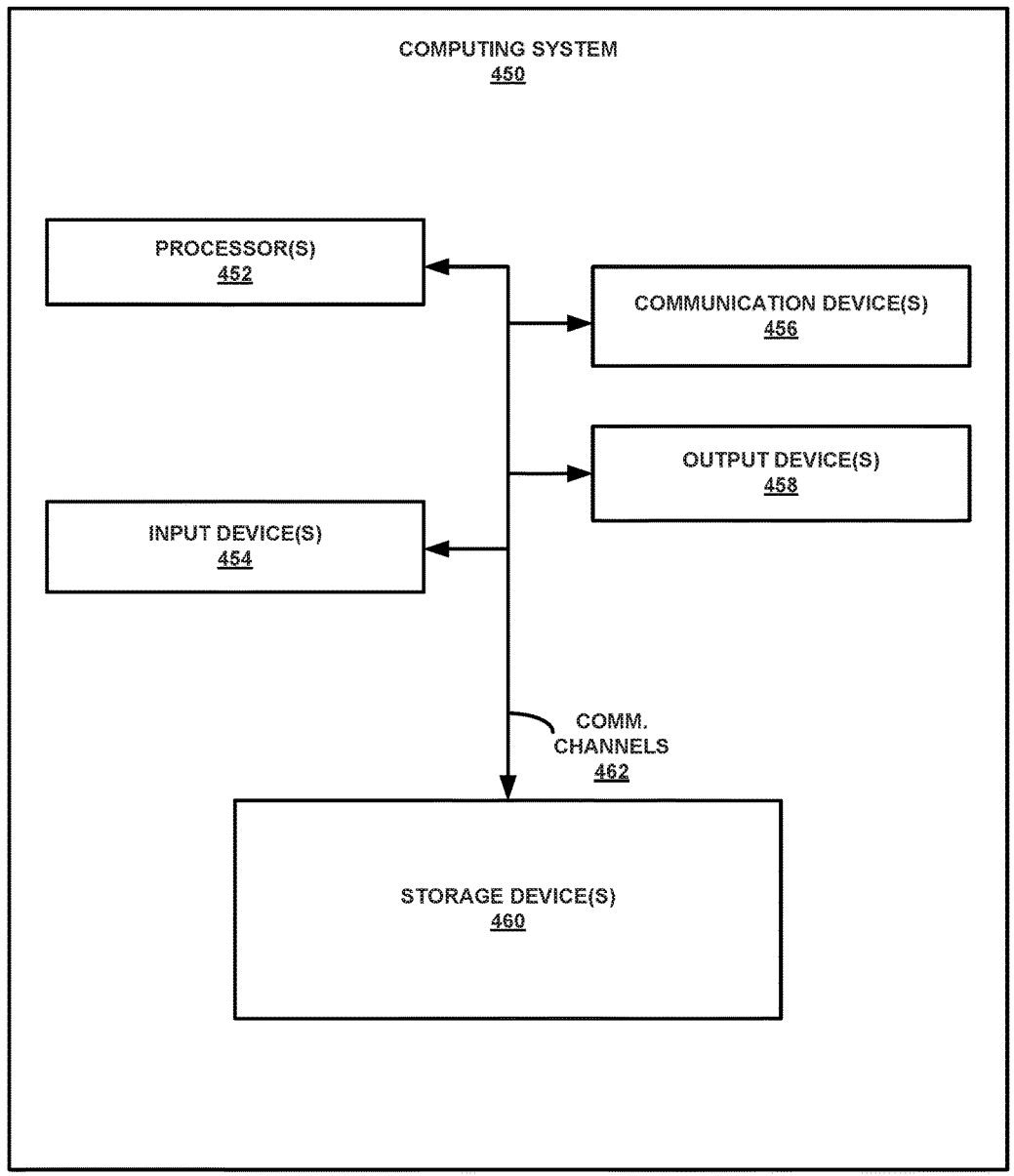
FIG. 4 is a block diagram illustrating further details of an example computing system, such as one or more of the computing systems shown in FIG. 1 or FIG. 2, in accordance with one or more aspects of the present disclosure.

FIG. 4 is a block diagram illustrating further details of an example computing system 450, such as one or more of the computing systems shown in FIG. 1 or FIG. 2, in accordance with one or more aspects of the present disclosure. For example, computing system 450 may be an example of one or more of central server computing system (FIG. 1), client computing system 120A (FIG. 1), client computing system 120N (FIG. 1), central server computing system 204 (FIG. 2), and/or client computing system 220A (FIG. 2). FIG. 4 illustrates only one particular example of computing system 450, and many other examples of computing system 450 may be used in other instances and may include a subset of the components shown, or may include additional components not shown, in FIG. 4.

As shown in the example of FIG. 4, computing system 450 includes one or more processors 452, one or more input devices 454, one or more communication devices 456, one or more output devices 458, and one or more storage devices 460. In some examples, computing system 450 may not include input devices 454 and/or output devices 458. Communication channels 462 may interconnect each of the components 452, 454, 456, 458, and 460 for inter-component communications (physically, communicatively, and/or operatively). In some examples, communication channels 462 may include a system bus, a network connection, an inter-process communication data structure, or any other method for communicating data between hardware and/or software.

One or more input devices 454 of computing system 450 may receive input. Examples of input are tactile, audio, and video input. Examples of input devices 454 include a presence-sensitive screen, touch-sensitive screen, mouse, keyboard, voice responsive system, video camera, microphone or any other type of device for detecting input from a human or machine.

One or more output devices 458 of computing system 450 may generate output. Examples of output are tactile, audio, and video output. Examples of output devices 458 include a presence-sensitive screen, sound card, video graphics adapter card, speaker, cathode ray tube (CRT) monitor, liquid crystal display (LCD), or any other type of device for generating output to a human or machine. Output devices 458 may include display devices such as cathode ray tube (CRT) monitor, liquid crystal display (LCD), or any other type of device for generating tactile, audio, and/or visual output.

One or more communication devices 456 of computing system 450 may communicate with one or more other computing systems or devices via one or more networks by transmitting and/or receiving network signals on the one or more networks. Examples of communication devices 456 include a network interface card (e.g. such as an Ethernet card), an optical transceiver, a radio frequency transceiver, or any other type of device that can send and/or receive information, such as through a wired or wireless network. Other examples of communication devices 456 may include short wave radios, cellular data radios, wireless Ethernet network radios, as well as universal serial bus (USB) controllers. Communication devices 456 may provide wired and/or wireless communication.

One or more storage devices 460 within computing system 450 may store information for processing during operation of computing system 450 (e.g., computing system 450 may store data accessed by one or more modules, processes, applications, or the like during execution at computing system 450). In some examples, storage devices 460 on computing system 450 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art.

Storage devices 460, in some examples, also include one or more computer-readable storage media. Storage devices 460 may be configured to store larger amounts of information than volatile memory. Storage devices 460 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 460 may store program instructions and/or data associated with one or more software/firmware elements or modules.

For example, when computing system 450 comprises an example of central server computing system 104 shown in FIG. 1, storage devices 460 may store instructions and/or data associated with system maintenance administrator application 106, rule deployment module 105, and system maintenance rules 108. When computing system 450 comprises an example of client computing system 120A shown in FIG. 1, storage devices 460 may store instructions and/or data associated with operating system 134A, other applications 136A, databases 138A, and software maintenance application 122A (which may include, for example, instructions and/or data associated with report manager 130A, system maintenance rules 132A, maintenance task manager 124A, rules manager 126A, and scheduling manager 128A, such as shown in the example of software maintenance application 122A in FIG. 1). When computing system 450 comprises an example of client computing system 120N shown in FIG. 1, storage devices 460 may store instructions and/or data associated with operating system 134N, other applications 136N, databases 138N, and software maintenance application 122N (which may include, for example, instructions and/or data associated with report manager 130N, system maintenance rules 132N, maintenance task manager 124N, rules manager 126N, and scheduling manager 128N).

When computing system 450 comprises an example of central server computing system 204 shown in FIG. 2, storage devices 460 may store instructions and/or data associated with system maintenance administrator application 206, rule deployment module 205, and cross-platform system maintenance rules 208 (includes cross-platform system maintenance rules 208A through 208M, as well as maintenance operation information 212A and scheduling information 214A, and also maintenance operation information 212M and scheduling information 214M). When computing system 450 comprises an example of client computing system 220A shown in FIG. 2, storage devices 460 may store instructions and/or data associated with operating system 234A, other applications 236A, databases 238A, and software maintenance application 222A (which may include, for example, instructions and/or data associated with report manager 230A, platform-specific system maintenance rules 232A, maintenance task manager 224A, rules manager 226A, and scheduling manager 228A). Storage devices 460 may also store instructions and/or data associated with maintenance operation information 312A shown in FIG. 3, including backup information 309A, restoration information 311A, directory monitoring information 313A, system update information 315A, patching information 317A, and/or system integrity information 319A.

Computing system 450 further includes one or more processors 452 that may implement functionality and/or execute instructions within computing system 450. For example, processors 452 may receive and execute instructions stored by storage devices 460 that execute the functionality of the elements and/or modules described herein. These instructions executed by processors 452 may cause computing system 450 to store information within storage devices 460 during program execution. Processors 452 may also execute instructions of the operating system to perform one or more operations described herein.

Figure 5:
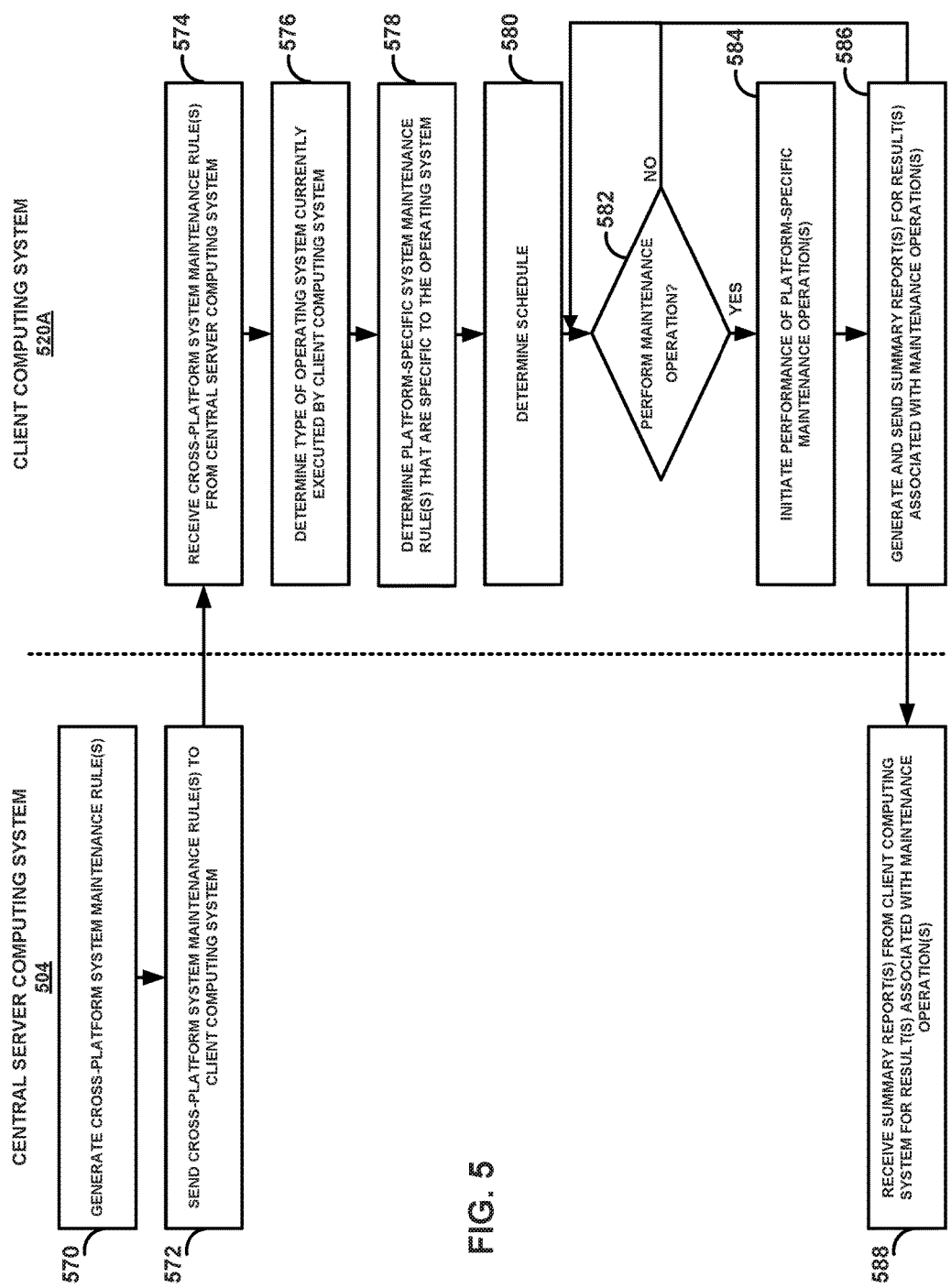
FIG. 5 is a flow diagram illustrating an example process that may be performed by a central server computing system and a client computing system, such as one or more of the computing systems shown in FIG. 1 or FIG. 2, in accordance with one or more aspects of the present disclosure.

FIG. 5 is a flow diagram illustrating an example process that may be performed by a central server computing system and a client computing system, such as one or more of the computing systems shown in FIG. 1 or FIG. 2, in accordance with one or more aspects of the present disclosure.

For example, the process illustrated in FIG. 5, which comprises one or more operations, may be performed central server computing system 504 and client computing system 520A shown in FIG. 2, such as by one or more software applications executed on such a system. Central server computing system 504 may be one example of central server computing system 104 (FIG. 1), central server computing system 204 (FIG. 2), and/or computing system 450 (FIG. 4). Client computing system 520A may be one example of client computing system 120A (FIG. 1), client computing system 220A (FIG. 2), and/or computing system 450 (FIG. 4).

As illustrated in FIG. 5, central server computing system 504 may generate (570) one or more cross-platform system maintenance rules (e.g., system maintenance rules 108 shown in FIG. 1 or system maintenance rules 208 shown in FIG. 2). The one or more cross-platform system maintenance rules specify one or more cross-platform system maintenance operations to be performed on client computing system 520A and further specify scheduling information for performance of the one or more cross-platform system maintenance operations. The one or more cross-platform system maintenance rules are not specific to any particular type of software operating system. Central server computing system 504 sends (572) the one or more cross-platform system maintenance rules to client computing system 520A.

Client computing system 520A receives (574) (e.g., using a software maintenance application such as software maintenance application 122A shown in FIG. 1 or software maintenance application 222A shown in FIG. 2) the one or more cross-platform system maintenance rules that are generated by and sent from central server computing system 504. Client computing system 520A determines (576) (e.g., using a rules manager such as rules manager 126A or rules manager 226A) a type of software operating system (e.g., operating system 134A shown in FIG. 1, operating system 234A shown in FIG. 2) currently being executed by client computing system 520A, and determines (578), based on the one or more cross-platform system maintenance rules and further based on the type of software operating system currently being executed by client computing system 520A, one or more platform-specific system maintenance rules (e.g., system maintenance rules 132A in FIG. 1, system maintenance rules 232A in FIG. 2) that specify one or more platform-specific system maintenance operations to be performed on client computing system 520A. These system maintenance rules may further specify scheduling information for performance of the one or more platform-specific system maintenance operations, and the one or more platform-specific system maintenance rules are specific to the type of software operating system currently being executed by client computing system 520A.

Client computing system 520A determines (580) (e.g., using scheduling manager 128A in FIG. 1, scheduling manager 228A in FIG. 2), based on the scheduling information identified by the one or more platform-specific system maintenance rules, a schedule indicating when to perform the one or more platform-specific system maintenance operations. Client computing system 520A may determine (582) if it is time to perform one or more of the platform-specific system maintenance operations. If it is not time ("NO" branch of 582), client computing system 520A continues to wait for a respective time to perform any such operations based on the schedule. If it is currently time to perform one or more such operations ("YES" branch of 582), client computing system 520A initiates (584) performance of the one or more platform-specific system maintenance operations in accordance with the schedule. Client computing system 520A may collect one or more results associated with the performance of the one or more platform-specific system maintenance operations.

Client computing system 520A may also generate and send (586) (e.g., using report manger 130A in FIG. 1, report manager 230A in FIG. 2) at least one summary report that includes the one or more results. Central server computing system 504 may then receive (588) (e.g., using system maintenance administrator application 106 in FIG. 1, system maintenance administrator application 206 in FIG. 2) the at least one summary report from client computing system 520A.

In some examples, client computing system 520A determines the schedule at least by determining (e.g., using scheduling manager 128A or 228A), based on the scheduling information identified by the one or more platform-specific system maintenance rules, a time-based schedule indicating one or more times at which to perform the one or more platform-specific system maintenance operations. Client computing system 520A may initiate performance of the one or more platform-specific system maintenance operations, collect the one or more results, generate the at least one summary report, and send the at least one summary report at each of the one or more times identified in the time-based schedule. In some examples, client computing system 520A determines the schedule at least by determining (e.g., using scheduling manager 128A or 228A), based on the scheduling information identified by the one or more platform-specific system maintenance rules, an event-based schedule indicating when to perform the one or more platform-specific system maintenance operations based upon an occurrence of one or more events.

In some examples, client computing system 520A determines the one or more platform-specific system maintenance rules at least by converting (e.g., using rules manager 126A or 226A) the one or more cross-platform system maintenance rules into the one or more platform-specific system maintenance rules based on the type of software operating system currently being executed by the client computing system. Client computing system 520A may convert the one or more cross-platform system maintenance rules into the one or more platform-specific system maintenance rules at least by generating one or more scripts that are configured to initiate performance of the one or more platform-specific system maintenance operations in accordance with the schedule, collect the one or more results, generate the at least one summary report, and send the at least one summary report to central server computing system 504.

In some examples, client computing system 520A receives the one or more cross-platform system maintenance rules at least by receiving (e.g., using rules manager 126A or 226A) a cross-platform backup rule that is not specific to any particular type of software operating system, the cross-platform backup rule specifying one or more cross-platform backup operations to be performed on client computing system 520A. Client computing system 520A may determine the one or more platform-specific system maintenance rules at least by determining (e.g., using rules manager 126A or 226A), based on the cross-platform backup rule and further based on the type of software operating system currently being executed by client computing system 520A, a platform-specific backup rule that is specific to the type of software operating system currently being executed by client computing system 520A. The platform-specific backup rule specifies one or more platform-specific backup operations to be performed on client computing system 520A, and the one or more results indicate the schedule and one or more items that were backed up during performance of the one or more platform-specific backup operations on client computing system 520A, the one or more items including, e.g., at least one of a file, an application, or a directory.

In some examples, client computing system 520A receives the one or more cross-platform system maintenance rules at least by receiving (e.g., using rules manager 126A or 226A) a cross-platform restoration rule that is not specific to any particular type of software operating system, the cross-platform restoration rule specifying one or more cross-platform restoration operations to be performed on client computing system 520A. Client computing system 520A determines the one or more platform-specific system maintenance rules at least by determining (e.g., using rules manager 126A or 226A), based on the cross-platform restoration rule and further based on the type of software operating system currently being executed by client computing system 520A, a platform-specific restoration rule that is specific to the type of software operating system currently being executed by client computing system 520A. The platform-specific restoration rule specifies one or more platform-specific restoration operations to be performed on client computing system 520A and further specifies event-based scheduling information for performance of the one or more platform-specific restoration operations upon an occurrence of one or more events on client computing system 520A. Client computing system 520A may determine the schedule at least by determining (e.g., using scheduling manager 128A or 228A), based on the scheduling information identified by the one or more platform-specific system maintenance rules, an event-based schedule indicating when to perform the one or more platform-based restoration operations based upon the occurrence of the one or more events. The one or more results may indicate one or more items that were restored during performance of the one or more platform-specific restoration operations on client computing system 520A, the one or more items including, e.g., at least one of a file, an application, a directory, or other data. The occurrence of the one or more events on client computing system 520A may include detection of one or more of an error, a virus, or a file deletion on client computing system 520A.

In some examples, client computing system 520A may receive the one or more cross-platform system maintenance rules at least by receiving (e.g., using rules manager 126A or 226A) one or more cross-platform system update or patch rules that are not specific to any particular type of software operating system, where the one or more cross-platform system update or patch rules specify one or more cross-platform system update or patch operations to be performed on client computing system 520A. Client computing system 520A may determine the one or more platform-specific system maintenance rules at least by determining (e.g., using rules manager 126A or 226A), based on the one or more cross-platform system update or patch rules and further based on the type of software operating system currently being executed by client computing system 520A, one or more platform-specific system update or patch rules that are specific to the type of software operating system currently being executed by client computing system 520A. The one or more platform-specific system update or patch rules specify one or more platform-specific system update or patch operations to be performed on client computing system 520A. The one or more results indicate one or more items that were updated or patched during performance of the one or more platform-specific system update or patch operations on client computing system 520A, where the one or more items including, e.g., at least one of a file, an application, or a directory.

In some examples, client computing system 520A receives the one or more cross-platform system maintenance rules at least by receiving (e.g., using rules manager 126A or 226A) one or more cross-platform directory monitoring or system integrity rules that are not specific to any particular type of software operating system, the one or more cross-platform directory monitoring or system integrity rules specifying one or more cross-platform system directory monitoring or system integrity operations to be performed on client computing system 520A. Client computing system 520A determines the one or more platform-specific system maintenance rules at least by determining (e.g., using rules manager 126A or 226A), based on the one or more cross-platform directory monitoring or system integrity rules and further based on the type of software operating system currently being executed by client computing system 520A, one or more platform-specific directory monitoring or system integrity rules that are specific to the type of software operating system currently being executed by client computing system 520A. The one or more platform-specific directory monitoring or system integrity rules specify one or more platform-specific directory monitoring or system integrity operations to be performed on client computing system 520A. The one or more results indicate one or more items that were monitored during performance of the one or more platform-specific directory monitoring or system integrity operations on client computing system 520A, and the one or more items include, e.g., at least one of a file, an application, or a directory.

In some examples, the one or more cross-platform system maintenance rules are associated with one or more group-level policies. Client computing system 520A may also be configured to convert (e.g., using rules manager 126A or 226A) the one or more group-level policies to one or more local policies for client computing system 520A, where the one or more platform-specific system maintenance rules are associated with the one or more local policies.

In some examples, client computing system 520A may generate the at least one summary report at least by determining (e.g., using report manager 130A or 230A) a size of the at least one summary based on a type of network connection between client computing system 520A and central server computing system 504. In some examples, client computing system 520A and/or central server computing system 504 may comprise a virtualized computing system that includes one or more virtual machines.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically programmable memory (EPROM), electrically erasable and programmable memory (EEPROM), compact-disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), general purpose microprocessors, application specific integrated circuits (ASIC's), field programmable logic arrays (FPGA's), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:

receiving, by at least one software application executing on a client computing system, one or more cross-platform system maintenance rules that are generated by and sent from a central server computing system, wherein the one or more cross-platform system maintenance rules specify one or more cross-platform system maintenance operations to be performed on the client computing system and further specify scheduling information for performance of the one or more cross-platform system maintenance operations, and wherein the one or more cross-platform system maintenance rules are not specific to any particular type of software operating system;

determining, by the at least one software application executing on the client computing system, a type of software operating system currently being executed by the client computing system;

determining, by the at least one software application executing on the client computing system, based on the one or more cross-platform system maintenance rules and further based on the type of software operating system currently being executed by the client computing system, one or more platform-specific system maintenance rules that specify one or more platform-specific system maintenance operations to be performed on the client computing system and further specify scheduling information for performance of the one or more platform-specific system maintenance operations, wherein the one or more platform-specific system maintenance rules are specific to the type of software operating system currently being executed by the client computing system;

determining, by the at least one software application executing on the client computing system, and based on the scheduling information identified by the one or more platform-specific system maintenance rules, a schedule indicating when to perform the one or more platform-specific system maintenance operations;

initiating, by the at least one software application executing on the client computing system, performance of the one or more platform-specific system maintenance operations in accordance with the schedule;

collecting, by the at least one software application executing on the client computing system, one or more results associated with the performance of the one or more platform-specific system maintenance operations;

generating, by the at least one software application executing on the client computing system, at least one summary report that includes the one or more results; and sending, by the at least one software application executing on the client computing system, and to the central server computing system, the at least one summary report.

2. The method of claim 1, wherein determining the schedule comprises determining, by the at least one software application executing on the client computing system, and based on the scheduling information identified by the one or more platform-specific system maintenance rules, a time-based schedule indicating one or more times at which to perform the one or more platform-specific system maintenance operations.

3. The method of claim 2, wherein initiating performance of the one or more platform-specific system maintenance operations, collecting the one or more results, generating the at least one summary report, and sending the at least one summary report are performed at each of the one or more times identified in the time-based schedule.

4. The method of claim 1, wherein determining the schedule comprises determining, by the at least one software application executing on the client computing system, and based on the scheduling information identified by the one or more platform-specific system maintenance rules, an event-based schedule indicating when to perform the one or more platform-specific system maintenance operations based upon an occurrence of one or more events.

5. The method of claim 1, wherein determining the one or more platform-specific system maintenance rules comprises converting, by the at least one software application executing on the client computing system, the one or more cross-platform system maintenance rules into the one or more platform-specific system maintenance rules based on the type of software operating system currently being executed by the client computing system.

6. The method of claim 5, wherein converting the one or more cross-platform system maintenance rules into the one or more platform-specific system maintenance rules comprises generating, by the at least one software application executing on the client computing system, one or more scripts that are configured to initiate performance of the one or more platform-specific system maintenance operations in accordance with the schedule, collect the one or more results, generate the at least one summary report, and send the at least one summary report to the central server computing system.

7. The method of claim 1,
wherein receiving the one or more cross-platform system maintenance rules comprises receiving, by the at least one software application executing on the client computing system, a cross-platform backup rule that is not specific to any particular type of software operating system, the cross-platform backup rule specifying one or more cross-platform backup operations to be performed on the client computing system, wherein determining the one or more platform-specific system maintenance rules comprises determining, by the at least one software application executing on the client computing system, based on the cross-platform backup rule and further based on the type of software operating system currently being executed by the client computing system, a platform-specific backup rule that is specific to the type of software operating system currently being executed by the client computing system, the platform-specific backup rule specifying one or more platform-specific backup operations to be performed on the client computing system, and wherein the one or more results indicate the schedule and one or more items that were backed up during performance of the one or more platform-specific backup operations on the client computing system, the one or more items comprising at least one of a file, an application, or a directory.

8. The method of claim 1,
wherein receiving the one or more cross-platform system maintenance rules comprises receiving, by the at least one software application executing on the client computing system, a cross-platform restoration rule that is not specific to any particular type of software operating system, the cross-platform restoration rule specifying one or more cross-platform restoration operations to be performed on the client computing system, wherein determining the one or more platform-specific system maintenance rules comprises determining, by the at least one software application executing on the client computing system, based on the cross-platform restoration rule and further based on the type of software operating system currently being executed by the client computing system, a platform-specific restoration rule that is specific to the type of software operating system currently being executed by the client computing system, the platform-specific restoration rule specifying one or more platform-specific restoration operations to be performed on the client computing system and further specifying event-based scheduling information for performance of the one or more platform-specific restoration operations upon an occurrence of one or more events on the client computing system, wherein determining the schedule comprises determining, by the at least one software application executing on the client computing system, and based on the scheduling information identified by the one or more platform-specific system maintenance rules, an event-based schedule indicating when to perform the one or more platform-based restoration operations based upon the occurrence of the one or more events, and wherein the one or more results indicate one or more items that were restored during performance of the one or more platform-specific restoration operations on the client computing system, the one or more items comprising at least one of a file, an application, a directory, or other data.

9. The method of claim 8, wherein the occurrence of the one or more events on the client computing system comprise detection of one or more of an error, a virus, or a file deletion on the client computing system.

10. The method of claim 1,
wherein receiving the one or more cross-platform system maintenance rules comprises receiving, by the at least one software application executing on the client computing system, one or more cross-platform system update or patch rules that are not specific to any particular type of software operating system, the one or more cross-platform system update or patch rules specifying one or more cross-platform system update or patch operations to be performed on the client computing system, wherein determining the one or more platform-specific system maintenance rules comprises determining, by the at least one software application executing on the client computing system, based on the one or more cross-platform system update or patch rules and further based on the type of software operating system currently being executed by the client computing system, one or more platform-specific system update or patch rules that are specific to the type of software operating system currently being executed by the client computing system, the one or more platform-specific system update or patch rules specifying one or more platform-specific system update or patch operations to be performed on the client computing system, and wherein the one or more results indicate one or more items that were updated or patched during performance of the one or more platform-specific system update or patch operations on the client computing system, the one or more items comprising at least one of a file, an application, or a directory.

11. The method of claim 1, wherein receiving the one or more cross-platform system maintenance rules comprises receiving, by the at least one software application executing on the client computing system, one or more cross-platform directory monitoring or system integrity rules that are not specific to any particular type of software operating system, the one or more cross-platform directory monitoring or system integrity rules specifying one or more cross-platform system directory monitoring or system integrity operations to be performed on the client computing system, and wherein determining the one or more platform-specific system maintenance rules comprises determining, by the at least one software application executing on the client computing system, based on the one or more cross-platform directory monitoring or system integrity rules and further based on the type of software operating system currently being executed by the client computing system, one or more platform-specific directory monitoring or system integrity rules that are specific to the type of software operating system currently being executed by the client computing system, the one or more platform-specific directory monitoring or system integrity rules specifying one or more platform-specific directory monitoring or system integrity operations to be performed on the client computing system, and wherein the one or more results indicate one or more items that were monitored during performance of the one or more platform-specific directory monitoring or system integrity operations on the client computing system, the one or more items comprising at least one of a file, an application, or a directory.

12. The method of claim 1, wherein the one or more cross-platform system maintenance rules are associated with one or more group-level policies, and wherein the method further comprises:

converting, by the at least one software application executing on the client computing system, the one or more group-level policies to one or more local policies for the client computing system, the one or more platform-specific system maintenance rules being associated with the one or more local policies.

13. The method of claim 1, wherein generating the at least one summary report comprises determining, by the at least one software application executing on the client computing system, a size of the at least one summary based on a type of network connection between the client computing system and the central server computing system.

14. The method of claim 1, wherein the client computing system comprises a virtualized computing system that includes one or more virtual machines.

15. A non-transitory computer-readable storage medium storing instructions that, when executed, cause a client computing system to perform operations comprising:

receiving, by at least one software application executing on the client computing system, one or more cross-platform system maintenance rules that are generated by and sent from a central server computing system, wherein the one or more cross-platform system maintenance rules specify one or more cross-platform system maintenance operations to be performed on the client computing system and further specify scheduling information for performance of the one or more cross-platform system maintenance operations, and wherein the one or more cross-platform system maintenance rules are not specific to any particular type of software operating system;

determining, by the at least one software application, a type of software operating system currently being executed by the client computing system;

determining, by the at least one software application, based on the one or more cross-platform system maintenance rules and further based on the type of software operating system currently being executed by the client computing system, one or more system maintenance rules that specify one or more platform-specific system maintenance operations to be performed on the client computing system and further specify scheduling information for performance of the one or more platform-specific system maintenance operations, wherein the one or more platform-specific system maintenance rules are specific to the type of software operating system currently being executed by the client computing system;

determining, by the at least one software application, and based on the scheduling information identified by the one or more platform-specific system maintenance rules, a schedule indicating when to perform the one or platform-specific more system maintenance operations;

initiating, by the at least one software application, performance of the one or more platform-specific system maintenance operations in accordance with the schedule;

collecting, by the at least one software application, one or more results associated with the performance of the one or more platform-specific system maintenance operations;

generating, by the at least one software application, at least one summary report that includes the one or more results collected; and sending, by the at least one software application, and to the central server computing system, the at least one summary report.

16. The non-transitory computer-readable storage medium of claim 15, wherein determining the schedule comprises determining, by the at least one software application executing on the client computing system, and based on the scheduling information identified by the one or more platform-specific system maintenance rules, a time-based schedule indicating one or more times at which to perform the one or more platform-specific system maintenance operations.

17. The non-transitory computer-readable storage medium of claim 16, wherein initiating performance of the one or more platform-specific system maintenance operations, collecting the one or more results, generating the at least one summary report, and sending the at least one summary report are performed at each of the one or more times identified in the time-based schedule.

18. The non-transitory computer-readable storage medium of claim 15, wherein determining the schedule comprises determining, by the at least one software application executing on the client computing system, and based on the scheduling information identified by the one or more platform-specific system maintenance rules, an event-based schedule indicating when to perform the one or more platform-specific system maintenance operations based upon an occurrence of one or more events.

19. The non-transitory computer-readable storage medium of claim 15,
   wherein receiving the one or more cross-platform system maintenance rules comprises receiving, by the at least one software application executing on the client computing system, a cross-platform backup rule that is not specific to any particular type of software operating system, the cross-platform backup rule specifying one or more cross-platform backup operations to be performed on the client computing system,
   wherein determining the one or more platform-specific system maintenance rules comprises determining, by the at least one software application executing on the client computing system, based on the cross-platform backup rule and further based on the type of software operating system currently being executed by the client computing system, a platform-specific backup rule that is specific to the type of software operating system currently being executed by the client computing system, the platform-specific backup rule specifying one or more platform-specific backup operations to be performed on the client computing system, and
   wherein the one or more results indicate the schedule and one or more items that were backed up during performance of the one or more platform-specific backup operations on the client computing system, the one or more items comprising at least one of a file, an application, or a directory.

20. The non-transitory computer-readable storage medium of claim 15,
   wherein receiving the one or more cross-platform system maintenance rules comprises receiving, by the at least one software application executing on the client computing system, a cross-platform restoration rule that is not specific to any particular type of software operating system, the cross-platform restoration rule specifying one or more cross-platform restoration operations to be performed on the client computing system,
   wherein determining the one or more platform-specific system maintenance rules comprises determining, by the at least one software application executing on the client computing system, based on the cross-platform restoration rule and further based on the type of software operating system currently being executed by the client computing system, a platform-specific restoration rule that is specific to the type of software operating system currently being executed by the client computing system, the platform-specific restoration rule specifying one or more platform-specific restoration operations to be performed on the client computing system and further specifying event-based scheduling information for performance of the one or more platform-specific restoration operations upon an occurrence of one or more events on the client computing system,
   wherein determining the schedule comprises determining, by the at least one software application executing on the client computing system, and based on the scheduling information identified by the one or more platform-specific system maintenance rules, an event-based schedule indicating when to perform the one or more platform-based restoration operations based upon the occurrence of the one or more events, and
   wherein the one or more results indicate one or more items that were restored during performance of the one or more platform-specific restoration operations on the client computing system, the one or more items comprising at least one of a file, an application, a directory, or other data.

21. The non-transitory computer-readable storage medium of claim 15,
   wherein receiving the one or more cross-platform system maintenance rules comprises receiving, by the at least one software application executing on the client computing system, one or more cross-platform system update or patch rules that are not specific to any particular type of software operating system, the one or more cross-platform system update or patch rules specifying one or more cross-platform system update or patch operations to be performed on the client computing system,
   wherein determining the one or more platform-specific system maintenance rules comprises determining, by the at least one software application executing on the client computing system, based on the one or more cross-platform system update or patch rules and further based on the type of software operating system currently being executed by the client computing system, one or more platform-specific system update or patch rules that are specific to the type of software operating system currently being executed by the client computing system, the one or more platform-specific system update or patch rules specifying one or more platform-specific system update or patch operations to be performed on the client computing system, and
   wherein the one or more results indicate one or more items that were updated or patched during performance of the one or more platform-specific system update or patch operations on the client computing system, the one or more items comprising at least one of a file, an application, or a directory.

22. The non-transitory computer-readable storage medium of claim 15,
   wherein receiving the one or more cross-platform system maintenance rules comprises receiving, by the at least one software application executing on the client computing system, one or more cross-platform directory monitoring or system integrity rules that are not specific to any particular type of software operating system, the one or more cross-platform directory monitoring or system integrity rules specifying one or more cross-platform system directory monitoring or system integrity operations to be performed on the client computing system, and wherein determining the one or more platform-specific system maintenance rules comprises determining, by the at least one software application executing on the client computing system, based on the one or more cross-platform directory monitoring or system integrity rules and further based on the type of software operating system currently being executed by the client computing system, one or more platform-specific directory monitoring or system integrity rules that are specific to the type of software operating system currently being executed by the client computing system, the one or more platform-specific directory monitoring or system integrity rules specifying one or more platform-specific directory monitoring or system integrity operations to be performed on the client computing system, and wherein the one or more results indicate one or more items that were monitored during performance of the one or more platform-specific directory monitoring or system integrity operations on the client computing system, the one or more items comprising at least one of a file, an application, or a directory.

23. The non-transitory computer-readable storage medium of claim 15, wherein the one or more cross-platform system maintenance rules are associated with one or more group-level policies, and wherein the operations further comprise:
converting, by the at least one software application executing on the client computing system, the one or more group-level policies to one or more local policies for the client computing system, the one or more platform-specific system maintenance rules being associated with the one or more local policies.

24. A computing system, comprising:
one or more processors; and
a non-transitory computer-readable storage medium storing instructions that, when executed, cause the one or more processors of a client computing system to:
receive, by at least one software application executing on the client computing system, one or more cross-platform system maintenance rules that are generated by and sent from a central server computing system, wherein the one or more cross-platform system maintenance rules specify one or more cross-platform system maintenance operations to be performed on the client computing system and further specify scheduling information for performance of the one or more cross-platform system maintenance operations, and wherein the one or more cross-platform system maintenance rules are not specific to any particular type of software operating system;
determine, by the at least one software application, a type of software operating system currently being executed by the client computing system;
determine, by the at least one software application, based on the one or more cross-platform system maintenance rules and further based on the type of software operating system currently being executed by the client computing system, one or more platform-specific system maintenance rules that specify one or more platform-specific system maintenance operations to be performed on the client computing system and further specify scheduling information for performance of the one or more platform-specific system maintenance operations, wherein the one or more platform-specific system maintenance rules are specific to the type of software operating system currently being executed by the client computing system;
determine, by the at least one software application, and based on the scheduling information identified by the one or more platform-specific system maintenance rules, a schedule indicating when to perform the one or more platform-specific system maintenance tasks;
initiate, by the at least one software application, performance of the one or more platform-specific system maintenance operations in accordance with the schedule;
collect, by the at least one software application, one or more results associated with the performance of the one or more platform-specific system maintenance operations;
generate, by the at least one software application, at least one summary report that includes the one or more results; and
send, by the at least one software application and to the central server computing system, the at least one summary report.

25. The computing system of claim 24, wherein the instructions stored by the non-transitory computer-readable storage medium that cause the one or more processors of the client computing system to determine the schedule cause the one or more processors of the client computing system to determine, by the at least one software application executing on the client computing system, and based on the scheduling information identified by the one or more platform-specific system maintenance rules, a time-based schedule indicating one or more times at which to perform the one or more platform-specific system maintenance operations.

26. The computing system of claim 25, wherein the instructions stored by the non-transitory computer-readable storage medium cause the one or more processors of the client computing system to initiate performance of the one or more platform-specific system maintenance operations, collect the one or more results, generate the at least one summary report, and send the at least one summary report at each of the one or more times identified in the time-based schedule.

27. The computing system of claim 24, wherein the instructions stored by the non-transitory computer-readable storage medium that cause the one or more processors of the client computing system to determine the schedule cause the one or more processors of the client computing system to determine, by the at least one software application executing on the client computing system, and based on the scheduling information identified by the one or more platform-specific system maintenance rules, an event-based schedule indicating when to perform the one or more platform-specific system maintenance operations based upon an occurrence of one or more events.

28. The computing system of claim 24, wherein the instructions stored by the non-transitory computer-readable storage medium that cause the one or more processors of the client computing system to determine the one or more platform-specific system maintenance rules cause the one or more processors of the client computing system to convert, by the at least one software application executing on the client computing system, the one or more cross-platform system maintenance rules into the one or more platform-specific system maintenance rules based on the type of software operating system currently being executed by the client computing system.

29. The computing system of claim 28, wherein the instructions stored by the non-transitory computer-readable storage medium that cause the one or more processors of the client computing system to convert the one or more cross-platform system maintenance rules into the one or more platform-specific system maintenance rules cause the one or more processors of the client computing system to generate, by the at least one software application executing on the client computing system, one or more scripts that are configured to initiate performance of the one or more platform-specific system maintenance operations in accordance with the schedule, collect the one or more results, generate the at least one summary report, and send the at least one summary report to the central server computing system.

30. The computing system of claim 24,
   wherein the one or more cross-platform system maintenance rules are associated with one or more group-level policies, and
   wherein the instructions stored by the non-transitory computer-readable storage medium further cause the one or more processors of the client computing system to:
      convert, by the at least one software application executing on the client computing system, the one or more group-level policies to one or more local policies for the client computing system, the one or more platform-specific system maintenance rules being associated with the one or more local policies.

* * * * *